May 9, 1961

A. W. GAUBATZ 2,983,530

SHAFT SEAL

Filed Nov. 18, 1955

INVENTOR.
Arthur W. Gaubatz
BY
Paul Fitzpatrick
ATTORNEY

United States Patent Office 2,983,530
Patented May 9, 1961

2,983,530
SHAFT SEAL

Arthur W. Gaubatz, Indianapolis, Ind., assignor to General Motors Corporation, Detroit, Mich., a corporation of Delaware Filed Nov. 18, 1955, Ser. No. 547,689

2 Claims. (Cl. 286—11.15)

My invention relates to fluid seals of the rotary contact type such as are used to prevent flow of fluid along a rotatable shaft which passes through a wall separating different fluids or fluids under different pressures.

The seal may be embodied as a part of the fuel pump described in my copending application for Fuel Pump S.N. 547,690, filed November 18, 1955. It is so illustrated herein, although the pump structure which is immaterial to the disclosure of the seal is omitted from this specification.

An important advantage of the seal lies in structure balancing the effective areas of a reciprocable seal member exposed to the pressures of the two fluids separated by the seal so that the contact pressure of the seal is substantially unaffected by variations in the pressures. The seal also involves structural features contributing to simplicity, compactness, reliability, and economy of the seal installation.

The principal objects of the invention are to provide a superior shaft seal of the rotary contact type and one of simple and economical structure.

The nature of the invention and the advantages thereof will be more clearly apparent to those skilled in the art from the succeeding detailed description of the preferred embodiment of the invention and the accompanying drawings in which.

Figure 1:
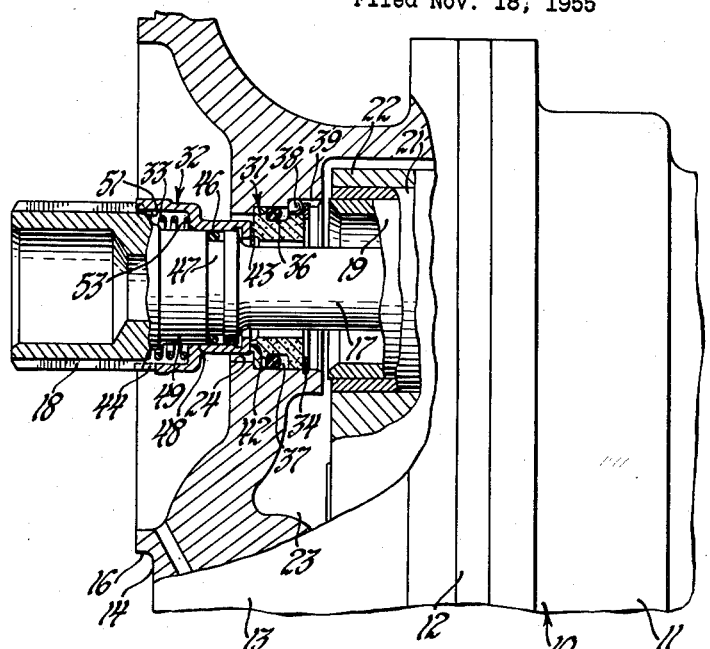
Figure 1 is a fragmentary view of a pump with parts cut away, the shaft seal of the invention being shown in longitudinal section.
Figure 2:
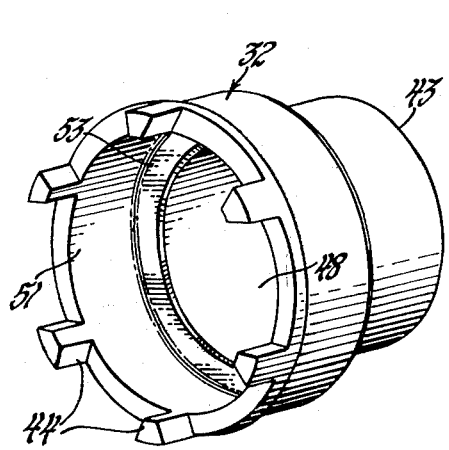
Figure 2 is an axonometric view of the rotating seal ring.
Figure 3:
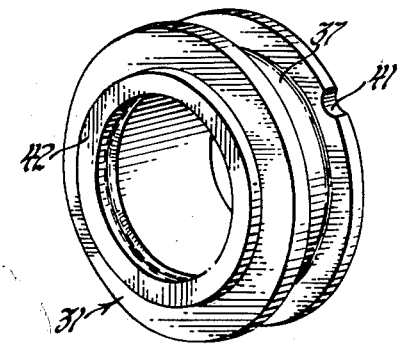
Figure 3 is an axonometric view of the fixed seal ring.

Referring first to Figure 1, by way of introduction, the pump illustrated in part comprises a body 10 including a casing 11, an end plate 12 and an end cover 13, these parts having flanges which are fixed together. The end cover 13 defines a mounting flange 14 which may be bolted to the case of a machine which drives the pump and which includes a pilot portion 16 to assure proper location of the pump on the driving machine. The pump includes a drive shaft 17 with an enlarged end portion splined in any suitable manner, as indicated at 18, for coupling to a shaft in the driving machine (not shown). This shaft may drive the operating parts of the pump including a gear, a portion of one trunnion of which is indicated at 19. The gear trunnion may be rotatably mounted in a bushing 21 mounted in a portion 22 of the end plate 12. The drive shaft 17 is coupled to the trunnion 19 by a coupling (not shown) which accommodates a certain amount of radial misalignment of the shaft with the trunnion. The cavity 23 within the pump body contains fluid, supplied to the gear pump under pressure by a boost pump, which must be contained against escape through the opening 24 in the wall defined by the end cover 13 through which the drive shaft extends.

This is accomplished by the seal of the invention, the principal parts of which are a stationary seal ring or annulus 31 of a carbon composition, a rotating ring 32 of metal reciprocably mounted on the shaft 17, and a coil spring 33 urging the two rings into engagement. Considering first the stationary ring, it is an annular body lodged against a shoulder in the bore 24 and retained by a snap ring 34. An O-ring 36 mounted in a groove 37 extending around the circumference of ring 31 prevents escape of fluid past the outer surface of the ring. Ring 31 is keyed against rotation by a ball 38 lodged in a keyway 39 in the body and in a notch 41 in the rim of the ring. Ball 38 is caged by the snap ring 34. Ring 31 has an annular radial sealing face 42 directed outwardly from the pump housing. This sealing face is engaged by the radial face 43 of the rotating ring 32.

Ring 32 is slidably mounted on the shaft and has extending from the outer end a number of tongues 44 which engage the inner end of splines 18 to prevent relative rotation of the ring 32 and shaft 17. An O-ring 46 mounted in a groove 47 in the shaft prevents leakage between ring 32 and the shaft. Ring 32 has an internal bore 48 which slidably fits on a portion 49 of the shaft which is intermediate in diameter between the main body of the shaft and the splined portion 18.

A counterbore 51 in the ring 32 defines a chamber for spring 33 which bears against the shoulder 53 of the ring and against the enlarged end of shaft 17. Spring 33 is of such constants as to provide the requisite pressure between the two seal rings, this pressure being dependent upon the dimensions of the parts. The seal engaging force is not critical but, if it is too small, the seal may leak, and if it is too great, there will be excessive wear.

The effect of pressures within and without the chamber 23 on the seal is balanced so that the desired seal engaging force is not disturbed by changes in pressure. As will be apparent, the net or effective area of ring 32 exposed to the fluid pressure inside the housing urging it into contact with ring 31 is equal to the difference between the area of the circle defined by the inner radius ($r_1$) of seal face 42 and the cross-sectional area of the portion 49 of the shaft. (Seal face 42 has a greater inner radius than seal face 43.) Full fluid pressure is exerted over this net area. Similarly, the effective area of ring 32 exposed to air pressure urging it into contact with ring 31 is the difference between the area of the circle defined by the outer radius ($r_o$) of seal face 42 (this radius being less than the outer radius of face 43) and the area of cross-section of shaft portion 49. Full air pressure is exerted over this net or effective area.

Fluid pressure between the two seal contact faces acting over the area of face 42 urges the rings apart. This pressure diminishes from full contained fluid pressure at the inner radius of face 42 to atmospheric pressure at the outer edge of face 42. The average pressure is substantially the mean of the two fluid pressures. If $r_o-r_1$ is small with respect to $r_1$ the force exerted is approximately equal to the sum of the two pressures multiplied by half the area of face 42. Therefore, by making the diameter of shaft 49 equal to the mean diameter of seal face 42, the fluid pressures on ring 32 will be substantially in balance and will not significantly vary the seal engaging force exerted by spring 33, notwithstanding pressure variations at either side of the wall.

If atmospheric or external pressure is taken as a datum, and the internal fluid pressure is expressed as gauge pressure, the area relationships may be more simply expressed by the relation that the effective piston area of the ring exposed to the internal fluid pressure is substantially half the area of the sealing surface or seal interface for a pressure balanced seal ring.

It will be noted that the structure of the seal is such that it tolerates any misalignment of shaft 17 with trunnion 19 and ring 31 coaxial with the trunnion which may be encountered in service. The shaft 17 is supported in the body 11 at a point remote from the seal so that slight radial misalignment of the drive end 18 of shaft 17 does not give rise to any great angularity of the shaft. The significant effect of such displacement is a slight eccentricity of the axes of the two seal rings which has no material effect on the performance of the seal.

By forming the rotary seal ring 32 for engagement with the drive splines 18 which must be provided for operation of the pump, and by virtue of the mode of installation of the fixed ring 31, a very simple structure is provided.

The detailed description of the preferred embodiment of the invention for the purpose of explaining the principles thereof is not to be construed as limiting the invention, as modifications of structure may be made by the exercise of skill in the art without departing from the principles of the invention.

I claim:

1. A seal installation comprising, in combination, a wall member adapted to separate regions of diverse fluid pressure, the wall member defining an opening, a rotatable shaft member extending through the opening, two seal rings encircling the shaft member in face-to-face contact, the area of contact of the two rings defining a sealing surface, one ring being mounted on and rotatable with the shaft member, the other ring being mounted on and restrained against rotation by the wall member, sealing means between each ring and the member on which it is mounted, one of the rings being mounted for reciprocation axially of the shaft member, the other of said rings being held against axial reciprocation, resilient means biasing said one ring into contact with said other ring, the reciprocably mounted ring having a net piston area exposed to the pressure of the fluids acting to urge the reciprocably mounted ring into engagement with the other ring substantially balancing the effective area of the sealing surface, whereby the biasing force acting to urge said rings into contact with each other is independent of variations in the diverse fluid pressures and depends solely on the biasing force of said resilient means.

2. A seal installation comprising, in combination, a wall member adapted to separate regions of diverse fluid pressure, the wall member defining an opening, a rotatable shaft member extending through the opening, two seal rings encircling the shaft member in face-to-face contact, the area of contact of the two rings defining a sealing surface, one ring being mounted on and rotatable with the shaft member, the other ring being mounted on and restrained against rotation by the wall member, sealing means between each ring and the member on which it is mounted, one of the rings being mounted for reciprocation axially of the shaft member, the other of said rings being held against reciprocation, resilient means biasing said one ring into contact with said other ring, the reciprocably mounted ring having a net piston area exposed to the pressure of the fluid on each side of the wall acting to urge the reciprocably mounted ring into engagement with the other ring substantially equal to half the area of the sealing surface, whereby the biasing force acting to urge said rings into contact with each other is independent of variations in the diverse fluid pressures and depends solely on the biasing force of said resilient means.

References Cited in the file of this patent
UNITED STATES PATENTS

| | | |
|---|---|---|
| 2,328,578 | Payne | Sept. 7, 1943 |
| 2,365,146 | Wichorek | Dec. 12, 1944 |
| 2,434,458 | Curry | Jan. 13, 1948 |
| 2,504,937 | Payne | Apr. 18, 1950 |
| 2,585,154 | Montgomery | Feb. 12, 1952 |

OTHER REFERENCES

Liquid Seal Handles High Pressures and Temperatures, Product Engineering, March 1950, page 178.